(12) United States Patent
Minerva et al.

(10) Patent No.: US 8,054,824 B2
(45) Date of Patent: Nov. 8, 2011

(54) METHOD FOR DIMENSIONING A DATA PACKETS HANDLER APPARATUS IN A PACKET-SWITCHED MOBILE COMMUNICATIONS NETWORK

(75) Inventors: Giuseppe Minerva, Turin (IT); Emanuele Silio, Turin (IT); Francesco Epifani, Turin (IT)

(73) Assignee: Telecom Italia S.p.A., Milan (IL)

( * ) Notice: Subject to any disclaimer, the term of this patent is extended or adjusted under 35 U.S.C. 154(b) by 395 days.

(21) Appl. No.: 11/920,850

(22) PCT Filed: May 24, 2005

(86) PCT No.: PCT/EP2005/005592
§ 371 (c)(1), (2), (4) Date: Apr. 3, 2009

(87) PCT Pub. No.: WO2006/125456
PCT Pub. Date: Nov. 30, 2006

(65) Prior Publication Data
US 2009/0201823 A1      Aug. 13, 2009

(51) Int. Cl.
*H04L 12/28*     (2006.01)
(52) U.S. Cl. ........................................ 370/351
(58) Field of Classification Search .................. 370/351, 370/389, 395.1, 395.2, 395.21, 395.4, 395.41; 455/130, 230, 266, 150.1, 200.1
See application file for complete search history.

(56) References Cited

U.S. PATENT DOCUMENTS

| | | | | |
|---|---|---|---|---|
| 5,051,982 A | * | 9/1991 | Brown et al. | 370/381 |
| 6,324,169 B1 | * | 11/2001 | Roy | 370/260 |
| 6,487,184 B1 | * | 11/2002 | Pecen et al. | 370/329 |
| 6,556,544 B1 | * | 4/2003 | Lee | 370/256 |
| 6,657,983 B1 | * | 12/2003 | Surazski et al. | 370/337 |
| 6,891,810 B2 | * | 5/2005 | Struhsaker et al. | 370/294 |
| 7,463,616 B1 | * | 12/2008 | Earnshaw et al. | 370/347 |

(Continued)

FOREIGN PATENT DOCUMENTS

WO    WO-00/24163    4/2000

(Continued)

OTHER PUBLICATIONS

Oftel: "The LRIC model of UK mobile network costs, developed for Oftel by Analysys: A manual for the Oftel model", XP-002363547, A Manual for the Oftel Model Working Paper for Oftel, pp. 1-161, (2001).

*Primary Examiner* — Chi Pham
*Assistant Examiner* — Fan Ng
(74) *Attorney, Agent, or Firm* — Finnegan, Henderson, Farabow, Garrett & Dunner, L.L.P.

(57) ABSTRACT

A method of dimensioning a data packets handler apparatus in a mobile communications network includes a plurality of cells, each one providing mobile communications coverage in a respective geographic area, the mobile communications network supporting packet-switched traffic and circuit-switched traffic, wherein the data packets handler apparatus to be dimensioned is associated with at least one cell of the mobile communications network. The method includes: obtaining an indication of radio communications resources of the at least one cell; obtaining an indication of an offered packet-switched traffic with respect to the at least one cell; and determining an amount of resources of the data packets handler apparatus potentially needed by the at least one cell for handling the packet-switched traffic based on the radio communications resources and on the offered packet-switched traffic.

20 Claims, 6 Drawing Sheets

U.S. PATENT DOCUMENTS

| | | | |
|---|---|---|---|
| 7,505,456 B2 * | 3/2009 | English et al. | 370/356 |
| 2002/0114280 A1 * | 8/2002 | Yi et al. | 370/235 |
| 2003/0095503 A1 * | 5/2003 | Ha | 370/232 |
| 2004/0066754 A1 * | 4/2004 | Hottinen | 370/252 |
| 2004/0116124 A1 | 6/2004 | Lepschy et al. | |
| 2005/0159165 A1 * | 7/2005 | Argyropoulos et al. | 455/452.2 |

FOREIGN PATENT DOCUMENTS

WO  WO-2004/091237 A1  10/2004

\* cited by examiner

METHOD FOR DIMENSIONING A DATA PACKETS HANDLER APPARATUS IN A PACKET-SWITCHED MOBILE COMMUNICATIONS NETWORK

CROSS REFERENCE TO RELATED APPLICATION

This application is a national phase application based on PCT/EP2005/005592, filed May 24, 2005, the content of which is incorporated herein by reference.

FIELD OF THE INVENTION

The present invention generally relates to the field of mobile communications, particularly mobile telephony, and to the design and deployment of Public Land Mobile Networks (PLMNs). In particular, the invention concerns a method for dimensioning a data packets handler apparatus in a Packet-Switched (PS) PLMN.

BACKGROUND OF THE INVENTION

Mobile telephony networks (PLMNs) were initially conceived for enabling voice communications, similarly to the wired, Public Switched Telephone Networks (PSTNs), but between mobile users, or between a mobile user and a fixed (wired) user. Wireless communications networks have experienced an enormous spread, especially after the introduction of second-generation mobile cellular networks, and particularly digital mobile cellular networks such as those complying with the Global System for Mobile communications (GSM) standard (and its United States and Japanese counterparts).

The services offered by these cellular networks in addition to plain voice communications have rapidly increased in number and quality; just to cite a few examples, services like the Short Message Service (SMS) and the Multimedia Message Service (MMS) services, and Internet connectivity services have been made available in the last few years.

However, these second-generation cellular networks, albeit satisfactory for voice communication, offer very poor data exchange capabilities.

Similarly to the PSTNs, second-generation cellular networks are in fact Circuit-Switched (CS) networks; this greatly limits the bandwidth that can be allocated for a given user. On the contrary, data communications networks such as computer networks and, among them, the Internet, adopt Packet Switching (PS) schemes, which allow for extremely higher data transfer rates.

Some solutions have been proposed to overcome the limitations of conventional, CS cellular networks such as the GSM networks, so as to enable users of mobile terminals efficiently exploiting services offered through the Internet. One of the solutions that have acquired a significant popularity is the General Packet Radio Service (shortly, GPRS). The GPRS is a digital mobile phone technology compatible with GSM networks (actually, built on the existing GSM network architecture) that enables data transfer at a speed higher than that allowed by pure GSM.

Essentially, the GPRS (and its evolution called Enhanced Data rates for Global Evolution; shortly, EDGE) is a GSM add-up that supports and enables packet-based (i.e., PS) data communication. The GPRS, being an almost ready-at-hand solution for enhancing the data exchange capabilities of already existing GSM networks, is gaining certain popularity.

Quite concisely, a GPRS network includes at least one Gateway GPRS Support Node (GGSN) acting as an interface between the mobile telephony network and one or more external packet data network, such as the Internet. The GGSN exchanges data packets, through a GPRS backbone network, with one or more Serving GPRS Support Nodes (SGSN); the generic SGSN routes the data packets received, through the GGSN and the GPRS backbone network, from the external packet data network, to the proper destination user's mobile communication terminal (commonly referred to as a mobile station).

In order to provide packet-based data communications services, the Base Station Controllers (BSCs) of the mobile telephony network (the network entities that control the network's radio stations, the so-called Base Transceiver Stations—BTSs) are associated with respective packet handling apparatuses known as the Packet Control Units (PCUs). The generic PCU is thus usually associated with a plurality of respective network's cells, and behaves as an interface of the respective BSC to a respective SGSN: it converts the data packets, received from the SGSN and directed to the destination mobile terminals located in the network cells of the associated plurality, into data streams adapted to being transmitted "over the air", by the proper network BTS, exploiting the radio resources of the network, and, dually, the PCU converts data streams transmitted by the mobile terminals "over the air" and received by the BTS into properly formatted data packets, for the transmission to the SGSN and GGSN.

The GPRS system's physical level is based on the GSM one, superimposing thereto a different logic structure. Control and data traffic "logic" channels are multiplexed in time and frequency division on a single GPRS physical channel, called Packet Date CHannel (PDCH). A PDCH corresponds to a physical GSM channel, and it is defined, in the frequency domain, by one of the GSM radio carriers, and, in the time domain, by one of the GSM time slots. Over a generic PDCH, one or more GPRS/EDGE connections may be established.

The generic PCU has resources for managing the interface (so-called Gb interface) with the SGSN, and resources for managing the interface with the radio front-end of the network, i.e. the BSCs and the BTSs.

The resources provided in the generic PCU for managing the interface towards the radio front-end can be described as composed of a collection of elementary resource units; for the purposes of the present invention, by resource unit there is intended the elementary, minimum set of resources of the PCU that are treated as an unique entity and that can be allotted as a whole for the management of a PDCH.

Within the generic PCU, one or more resource units may be univocally assigned to a single PDCH. The association between the one or more PCU's resource units and the PDCH is in general released when the GPRS data connection(s) that required the assignment of PCU resources are terminated, and the PDCH is released.

It appears that there is a strong correlation between the PCU's overall capability to handle data packet connections, and the variability in time (in terms of both offered traffic and length of the single call) of the data connections on the radio interface.

The dimensioning of the PCUs' resources, particularly the number of elementary resources for managing the interface towards the radio front-end of the network, is thus a critical aspect of the design of a GPRS network, especially in consideration of the foreseeable increase in time of the GPRS and EDGE users, also due to the increase in number and quality of the PS services offered.

Manufacturers of network apparatuses usually carry out the dimensioning of a PCU from the viewpoint of the number of elementary resources to be provided based on empirical approaches, which are essentially based on the knowledge of the number of installed radio resources (i.e., the number of installed FDMA/TDMA radio carriers) of the radio front end of each network cell coupled to the PCU being dimensioned.

SUMMARY OF THE INVENTION

The Applicant has tackled the problem of how to efficiently dimensioning a PS mobile communications network, and, particularly, its data packets handler network apparatuses, like the PCUs in GPRS networks, even more particularly the part thereof intended to manage the interface towards the radio front-end of the network.

The Applicant has observed that the conventional, empirical approaches to the PCU dimensioning are not completely satisfactory.

In particular, the Applicant has observed that basing the PCU dimensioning only on the installed radio resources of the different network cells may result in either an excessively conservative dimensioning, with waste of unused resources, or in an under-dimensioning of the PCU, with highly negative impact on the network operation.

The Applicant has found that a far better way to dimension the resources of a generic PCU, particularly from the viewpoint of the amount of elementary resources to be provided for managing the interface towards the radio front-end, calls for taking into account an actual occupation, based on the offered traffic, of the radio resources of the network cells under responsibility of the PCU being dimensioned, rather than simply considering the installed radio resources.

In particular, the Applicant has observed that the coexistence in a generic network cell of different types of traffic, such as for example voice (CS) and data (PS) traffic, may cause the actual occupation of the cell's radio resources by the data packets traffic (GPRS and/or EDGE) to significantly vary and make the amount of PCU's elementary resources necessary substantially depart from the amount that would be calculated simply based on the installed radio resources. This may for example be due to the policies adopted in the network for assigning the physical, radio channels (TCHs/PDCHs) to the different calls (voice or data).

According to an aspect of the present invention, a method for dimensioning a data packet handler network apparatus is provided, as set forth in the appended claims.

Summarizing, the method comprises:

obtaining an indication of radio communications resources of at least one cell with which the data packets handler apparatus is associated, obtaining an indication of an offered packet-switched traffic in respect of the at least one cell, and determining an amount of resources of the data packets handler apparatus potentially needed by said at least one cell for handling the packet-switched traffic based on said radio communications resources and on said offered packet-switched traffic.

Preferred features of the method are provided in the dependent claims.

In particular, the Applicant has moreover found that an even better dimensioning can be achieved by also taking into account the variability in time of the offered traffic, i.e. the distribution, for example over the different hours of a generic day, of the different typologies of traffic offered to each of the cells under responsibility of the PCU being dimensioned. In particular, taking into account the time variability of the traffic offered to the different cells coupled to the PCU allows to take into account the fact that, in principle, each cell has a peak traffic hour that may differ from the peak traffic hours of the other cells, both for the voice and for the data traffic.

According to another aspect of the present invention, a computer program as set forth in an appended claim, comprising instructions for carrying out the steps of the method according to the first aspect of the invention when the program is executed on a computer system.

According still another aspect of the present invention, a data packets handler apparatus is provided, as set forth in the appended claims.

The data packets handler apparatus comprises resources for handling packet-switched traffic, said data packets handler apparatus resources being related to radio communications resources of said at least one cell and to an offered packet-switched traffic offered to at least one cell with which the data packets handler apparatus is associated.

Preferred features of the data packets handler apparatus are provided in dependent claims.

BRIEF DESCRIPTION OF THE DRAWINGS

The features and advantages of the present invention will be made clear by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
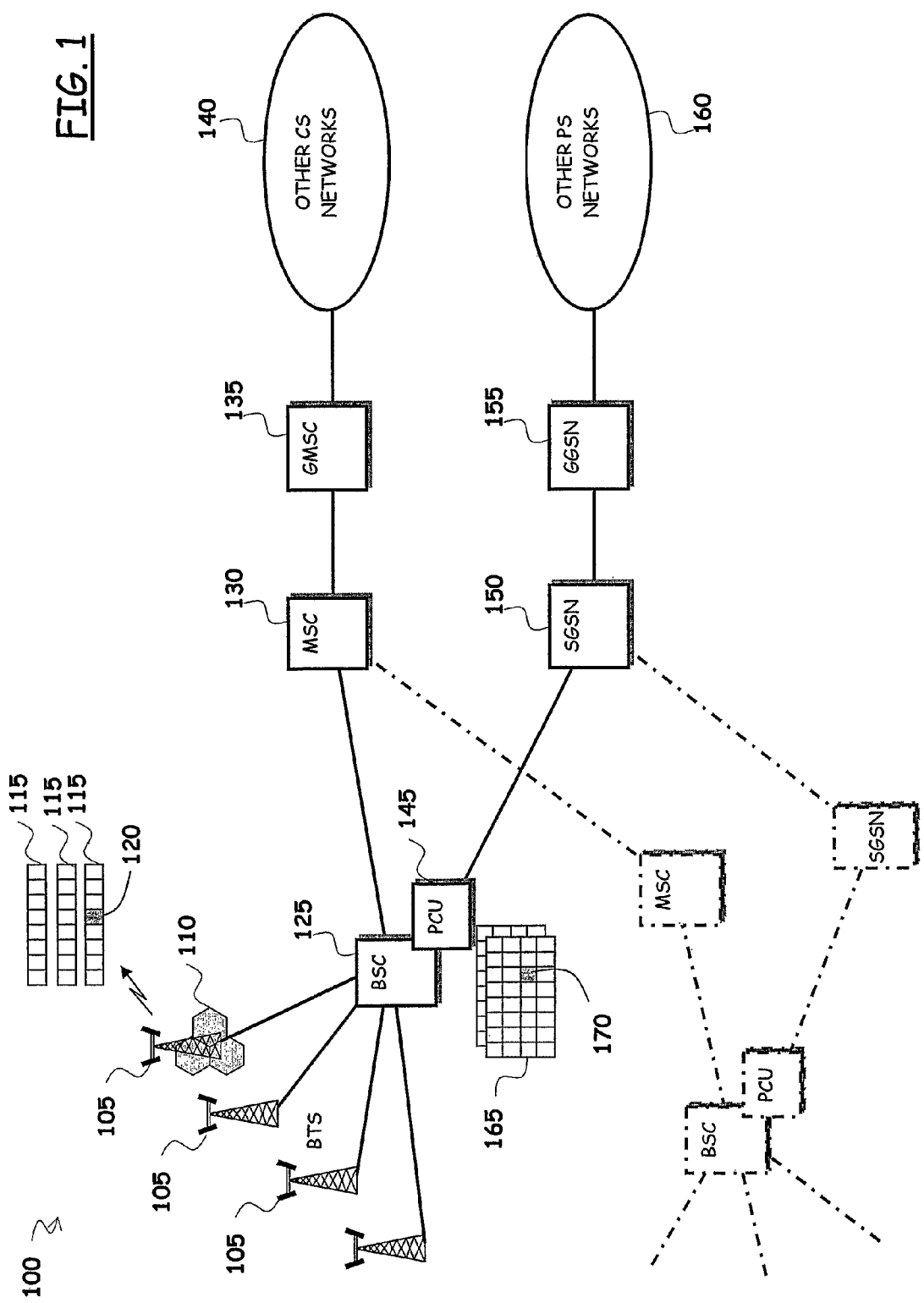
FIG. 1 schematically shows the architecture of a mobile communications network supporting PS communications, particularly a GSM/GPRS/EDGE network.

Making reference to the drawings, in FIG. 1 there is schematically shown, partly in terms of functional blocks, the architecture of a mobile telephony network supporting packet-switched (or packet-based) (PS) data communications and circuit-switched (PS) communications, for example a GSM network enhanced with a GPRS infrastructure; only the network components relevant to the understanding of the invention embodiment being described are shown. It is observed that the architecture depicted in FIG. 1 is also valid for a GSM network with an EDGE infrastructure, and, more generally, it is also valid for a UMTS network with associated a GPRS/EDGE infrastructure.

Essentially, the network, globally referred to as 100, comprises one or more, typically a plurality of BTSs 105. Each BTS 105 typically comprises from one to a maximum of e.g., three network cells 110, the network cell being the elementary network unit that is equipped with a radio transmitting/receiving apparatus adapted to provide radio coverage of a given geographic area. Within each cell 110, one or more, typically a plurality of FDMA/TDMA radio carriers 115 are available for the communication with user's mobile communications terminals (not shown) located within the cell. Each radio carrier 115 supports a number of, typically, eight radio channels 120 for voice calls, i.e. for CS traffic (these channels are referred to as Traffic CHannels or TCHs) and for signalling purposes; the TCHs, i.e. those among the radio channels that are not dedicated to signalling, can in principle be exploited for delivering packet data traffic.

The network 100 comprises one, typically more, BSCs 125, to which one or more BTSs are connected. The BSCs 125 are connected to the CS core network through a Mobile Switching Center (SC) 130; the MSC 130 is usually connected to other MSCs 130 of the network 100, shown in phantom in the drawing (with the associated structure of BSC(s), BTS(s), etc.), and to a Gateway Mobile Switching Center (GMSC) 135, acting as a gateway towards other CS networks, such as other PLMNs and/or PSTNs (globally indicated as 140).

The apparatuses enabling packet-based (PS) communications include, associated with each BSC 125, a respective PCU 145; the generic PCU 145, usually co-located with the respective BSC 125, is connected to the PS core network through a Service GPRS Support Node (SGSN) 150; the SGSN 150, in addition to being connected to other SGSNs of the network (depicted in phantom in the drawing) is connected to a Gateway GPRS Support Node (GGSN) 155, which acts as a gateway towards other PS networks (globally indicated as 160), e.g. the Internet, an intranet, and the like.

The procedure for enabling the fruition of a GPRS service in respect of a generic user equipped with a mobile communications terminal supporting GPRS communications in a generic cell 110 essentially involves two steps: a first step (called Packet Data Protocol—PDP—context activation) in which a logic connection (the so-called PDP context) is created between the user's mobile communications terminal and a server (not shown) in the PS network providing the service contents; and a second step (called Temporary Block Flow—TBF—activation/release) in which the network 100 assigns to the mobile communications terminal prescribed physical communication resources, namely radio resources for transmission on the "over the air" radio link portion of the cellular network 100.

In particular, without entering into excessive details well known to those skilled in the art, the mobile communications terminal, after having registered at the SGSN serving the cell in which the user is located at that moment, sends to the competent SGSN a request for activation of a PDP context; the PDP context defines the packet data network to be used (for example, the Internet), the GGSN to be used for accessing the packet data network (for example, the GGSN 155), and other parameters.

The PDP context request triggers a PDP context activation procedure in which the mobile terminal, the SGSN and the GGSN exchange information useful to negotiate PDP context parameters.

The PDP context activation procedure results in the definition of a data packets transfer path between the GGSN and the PCU associated with the BTS that covers the cell in which the user is located. The PDP context, i.e. a logic connection between the mobile terminal and the information provider server, is thus created.

The activation of the PDP context does not involve per-se the allocation of physical communication resources of the network 100, but merely establishes a logic connection between the mobile terminal and the server; thus, the PDP context, once activated, may be kept active for hours, in principle forever, even when there are no data to be exchanged between the server and the mobile terminal, until the mobile terminal (or, possibly, the server) deactivates it.

After the PDP context has been activated, the BSC checks whether there are data received from the server through the respective PCU to be transmitted to the mobile terminal; in the affirmative case, a TBF is activated by the BSC.

The activation of the TBF determines the allocation of physical radio communications resources of the network 100, i.e. of a radio channel (an air link channel), to the mobile terminal for enabling the exchange of the data packets from the data transfer path (converted in a suitable data stream by the PCU) through the proper BSC and BTS over the air to the mobile terminal.

After the data have been exchanged, the TBF is deactivated and the radio resources are released; provided the PDP context is not closed, the BSC waits for new data to be exchanged. Thus, differently from the PDP context, the TBF, i.e. the physical radio communications resources of the GSM network 100, are kept allocated for the mobile terminal only as long as there are data to be transmitted/received to/from it, and are released as soon as the data have been exchanged, keeping the radio resources free for other uses/users. In other words, a TBF is temporary and is maintained only for the duration of the data transfer.

The generic PCU 145 is thus the network entity that handles data packets, performing in particular packetizing/depacketizing operations. In particular, a PCU includes hardware and/or software resources for managing the Gb interface and for managing the interface towards the radio front-end. On the radio front-end side, the PCU has resources dedicated to the control and handling of the data connections with the mobile terminals in the cells under responsibility thereof. In particular, the generic PCU 145 preferably has installed therein a number of boards 165, each board including a predefined number of elementary resource unit; 170.

As stated in the foregoing, for the purposes of the present invention, by PCU elementary resource unit there is intended the elementary, minimum set of resources of the PCU that are treated as an unique entity and that can be allotted as a whole for the management of a data packet connection, i.e. a PDCH, in a generic one of the network cells in the group of cells that are under the control of the BSC to which the PCU is associated. One or more elementary resource units may be necessary to manage a single PDCH occupied on the radio front-end; in the following, the number of elementary resource units needed to manage a single PDCH will be denoted as $N_{eru \times PDCH}$ (wherein $N_{eru \times PDCH}$ is an integer $\geq 1$). The generic PCU board contains a predetermined number of PCU elementary resource units, which may be equal for all the boards.

As discussed in the introductory part of the present description, a critical aspect in the design and planning of the network 100 is the dimensioning of the PCUs 145, particularly from the viewpoint of the PCU resources to be provided for managing the interface towards the radio part of the network or, in other words, the dimensioning in terms of the number of elementary resource units, or number of PCU boards, to be installed.

Adopting a simple approach, given the number $N_{cells}$ of cells which will be under responsibility of the PCU being dimensioned, the number $N_{eru \times PDCH}$ of PCU's elementary resource units needed to manage a single PDCH, and the maximum number $PDCH_i^{max}$ of physical (radio) GPRS channels (PDCHs) exploitable for data connections in the i-th cell associated with the PCU, the total PCU's elementary resource units $N_{eru,PCU}$ to be installed in the PCU is calculated in the following way:

$$N_{eru,PCU} = \left( \sum_{i=1}^{N_{cells}} PDCH_i^{max} \right) \cdot N_{eruxPDCH} \quad (1)$$

In this way, the PCU dimensioning is only based on the knowledge of the number of installed radio resources (the FDMA/TDMA radio carriers) of the radio front end of each network cell coupled to the PCU being dimensioned.

According to the applicant, this PCU dimensioning is unnecessarily conservative, because it guarantees a one-to-$N_{eruxPDCH}$ association between the PDCHs potentially usable in the cells associated with a PCU, and the PCU's elementary resource units: if, on one hand, this one-to-$N_{eruxPDCH}$ association ensures that there are always PCU resources available for managing the interface towards the radio channels, on the other hand it inevitably involves an over-dimensioning of the PCU, because it is extremely unlikely that all the PDCHs will be actually exploited for data traffic: one or more PDCHs may remain unused, for example due to pre-emption by voice (CS) calls over data traffic (GSM voice calls usually have priority over GPRS/EDGE connections: an established data connection may be released in case of resource congestion, if a new voice call arrives), or because the amount of offered GPRS/EDGE traffic not necessarily requires (in the i-th cell) using the maximum number of channels $PDCH_i^{max}$ to be delivered in a way considered satisfactory. Considering the generic, i-th cell, the maximum number of channels $PDCH_i^{max}$ depends on a number of different aspects, such as the number of radio carriers installed in the cell (a parameter strictly related to the criteria adopted for dimensioning the BTSs), the cell's resource configuration in terms of PDCHs exploitable for GPRS/EDGE, and the manufacturer of the network apparatuses: these parameters are mainly non-controllable, or only partially controllable by the network designer. All this enhances the deviation of the number of PDCHs potentially exploitable in that cell from the number of PDCHs actually occupied by data connections in a given cell: the larger such a deviation, the less efficient the PCU dimensioning achieved following the first approach.

Another possible approach, trying to reduce the number of PCU's elementary resource units to be installed, calls for defining a ratio (for example, 6:5, 4:3, 3:2) between the maximum number of PDCHs exploitable in a generic cell for data packets traffic, and the number of PCU's elementary resource units having to manage them. Introducing such a ratio α, the previous eq. 1 becomes:

$$N_{eru,PCU} = \alpha \cdot \left( \sum_{i=1}^{N_{cells}} PDCH_i^{max} \right) \cdot N_{eruxPDCH} \quad (2)$$

with α equal, e.g., to 0.75.

The reduction factor α is however independent from the actual distribution of the voice and data traffic offered in each cell, being only based on empirical data that can change in time, in an unpredictable way, and/or it can be unable to track the increase both of users and of data connections per user offered to the cell and the changes in the network's operating conditions.

According to the Applicant, the above-discussed approaches to PCU dimensioning are not satisfactory.

According to an aspect of the present invention, a method for dimensioning the PCUs is provided, as will be described in the following.

The dimensioning method essentially calls for dimensioning the PCU not merely relying on the installed radio resources (possibly scaled down by applying a more or less arbitrary reduction factor), but rather taking into account an actual occupation of the radio resources of the network cells under responsibility of the PCU being dimensioned particularly based on the estimation/measurement of the traffic offered to the cells.

In particular, the Applicant has observed that the coexistence, in a generic network cell, of different types of traffic, such as for example voice (CS) and data (PS) traffic, may cause the actual occupation of the radio resources of that cell's by the data traffic (GPRS and/or EDGE) to significantly vary, and make the amount of PCU's elementary resources necessary for handling that traffic amount to depart even substantially from the amount of resources that would be hypothetically required should the dimensioning be simply based on the radio resources installed in the cells.

For example, policies adopted in the network for assigning the cell's physical radio channels (TCHs/PDCHs) to the different calls (voice or data), like for example a priority ("preemption") given to the voice calls with respect to the data calls, may cause the actual data packets connections to be handled by the PCU to be much less than the connections corresponding to the full capability of the network cells based on the installed radio resources.

Moreover, the offered traffic (voice and data) typically exhibits a variability in time, which differs from cell to cell. For example, the distribution over the different hours of a generic day of the week of the different typologies of traffic offered to each of the cells under responsibility of the PCU being dimensioned varies. Typically, for any typology of offered traffic, a generic cell has a peak traffic time (i.e. the time of the day, e.g., hour(s) in which that typology of offered traffic is highest) that differs from the peak traffic time of the other cells.

In particular, the PCU dimensioning method according to an embodiment of the present invention exploits the data described herein below.

A first class of data exploited by the method according to the described embodiment of the invention includes data concerning the configuration of the network cells under control of the BSC 125 to which the PCU being dimensioned is associated, particularly:

the overall number $N_{cells}$ of network cells 110;
the number $E_i$ of radio carriers installed in those network cells 110 whose radio equipment has already been determined, and is not susceptible of being modified;

A second class of data includes design data (i.e., data defined by the network designer), particularly:

a list of network cells 110, under control of that BSC 125, in respect of which the installed radio resources (or radio equipment, i.e. the number of radio carriers) is not known, having not yet been determined, or, if it is known, because it has already been determined, it is susceptible of being modified;

the required voice loss $B^v$ in respect of the offered voice traffic, where the voice loss is given by the ratio between the number of voice calls that are not accepted by the generic cell for congestion reasons, and the total number of voice calls offered to the same cell;

the required data loss $B^d$ in respect of the offered data traffic, where the data loss is given by the ratio between the number of data connections that are not accepted by the generic cell for congestion reasons, and the total number of data connections offered to the same cell;

the required throughputs $Th^{UL,g}$, $Th^{DL,g}$ (in kbps) in Up-Link (UL) and in Down-Link (DL) for the offered GPRS data traffic, i.e. the minimum transmission rate for GPRS data traffic to be guaranteed in each cell during radio equipment dimensioning phase;

the required throughputs $Th^{UL,e}$, $Th^{DL,e}$ (in kbps) in Up-Link (UL) and in Down-Link (DL) for the offered EDGE data traffic (if any), i.e. the minimum transmission rate for EDGE data traffic to be guaranteed in each cell during radio equipment dimensioning phase;

a number $N_{fo}$ of daily time periods in which the time of the day is subdivided (for example 24 time periods of 60 minutes each); and a design parameter, referred to as the busy time value $BT_{PCU}$, whose value is indicative of the reliability of the PCU dimensioning.

A third class of data exploited by the method according to the described embodiment of the invention includes information concerning the traffic offered to the cells, taking in particular into account the variability in time of the offered traffic. This class of data includes:

the Single-Rate (SR) and Dual-Rate (DR) voice traffic $T^v_{i,j,SR}$, $T^v_{i,j,DR}$ (in Erlang) offered to the i-th network cell in the j-th time period; the SR voice traffic is the voice traffic offered to the cell by mobile terminals using a TCH, during the connection, for 100% of the time (in this case, the voice call is carried in Full Rate—FR—coding), whereas the DR voice traffic is the voice traffic offered to the same cell by mobile terminals using a TCH either for 100% of the time (when voice call is carried in FR coding) or for 50% of the time (when voice call is carried in Half Rate—HR—coding); as a consequence of this, in HR coding a single TCH is occupied by two "contemporary" voice calls;

the UL and DL GPRS data traffic $T^{UL}_{i,j,g}$, $T^{DL}_{i,j,g}$ (in Mbph) offered to the i-th network cell in the j-th time period;

the UL and DL EDGE data traffic $T^{UL}_{i,j,e}$, $T^{DL}_{i,j,e}$ (in Mbph) offered to the i-th network cell in the j-th time period.

A fourth class of data exploited by the method according to the described embodiment of the invention includes PCU configuration data, particularly:

the capacity $C_{PCU}$ in elementary resource units of the generic elementary PCU board 165;

the number $R_{PCU,g}$ (in PCU's elementary resource units per occupied PDCH) of PCU resources occupied in the PCU by a single GPRS-type connection (this number corresponds to the parameter $N_{eru \times PDCH}$ in eq. 1 in case of GPRS PDCHs);

the number $R_{PCU,e}$ (in PCU's elementary resource units per occupied PDCH) of PCU resources occupied in the PCU by a single EDGE-type connection (this number corresponds to the parameter $N_{eru \times PDCH}$ in eq. 1 in case of EDGE PDCHs).

Further network cells configuration data (i.e., belonging to the first class of data in the above listing) exploited by the method according to an embodiment of the invention include configuration data of the radio resources of each network cell 110 under control of the BSC 125 to which the PCU being dimensioned is associated. These configuration data include in particular:

the number $N_{TSS,i}$ of PDCHs statically assigned to the data traffic in the i-th cell;

the number $N_{e,i}$ of PDCHs configured in EDGE mode in the i-th cell (these PDCHs may be used by EDGE mobile terminals to establish EDGE connections, whereas the remaining PDCHs can only be used for establishing GPRS connections, both by GPRS and EDGE terminals);

the activation threshold of the DR resources in the i-th cell; the value of the activation threshold expresses the percentage of TCHs that have to be occupied by voice calls only using FR coding; in fact, when the number of TCHs occupied, in a given instant, by voice calls is less than the product of the total number of TCHs available in the cell by the activation threshold, both SR and DR mobile terminals connect to the cell using FR coding; instead, when the number of occupied TCHs, in a given instant, is equal to or higher than the product between the total number of TCHs available in the cell and the activation threshold, SR mobile terminals connect to the cell using, also in this case, FR coding, whereas DR mobile terminals connect to the cell using HR coding;

multiplexing parameters of users of data traffic over the PDCHs of the i-th cell (depending on the apparatus manufacturer, these parameters correspond to the maximum, or to the preferred number of users than can be multiplexed on each available PDCH);

the mobile terminal capability of the mobile terminals used by the users offering data traffic to the cell (this parameter corresponds to the number of PDCHs required by a mobile terminal for setting up a data connection);

code schemes used for handling the GPRS and EDGE connections in the i-th cell; by code scheme there is intended, in the context of the present description, the type of coding and modulation technique used for data transmission (GPRS and EDGE mobile terminals use, respectively, four and nine different code schemes);

the actual bit rate of a single GPRS or EDGE PDCH in the i-th cell (the actual bit rate of a PDCH depends on code schemes used for handling the GPRS and EDGE connections and on interferential conditions perceived by the i-th cell);

the maximum number of carriers that can be allotted in a cell (this parameter is used both in the dimensioning phase of new cells, and in the phase of revision of the already active and modifiable cells); and the number of signalling channels associated with every admissible equipment; to each admissible equipment of the cell (number of carriers installed, for example, from 1 to 15) there is associated a number of time slots dedicated to signalling procedures and not usable as traffic channels.

Based on the knowledge of the above-listed data, a method according to an embodiment of the present invention determines an optimized dimensioning of the PCU required for a satisfactory handling of the PDCHs exploited for data traffic; in particular, under the assumption that the number $C_{PCU}$ of PCU elementary resource units per PCU board is known a priori (PCU resources are typically made available by manufacturers of network equipment in boards of predefined capacity in terms of elementary resources units) the result of the PCU dimensioning process provides the number of PCU boards required for a satisfactory handling of the data traffic PDCHs.

Figure 2:
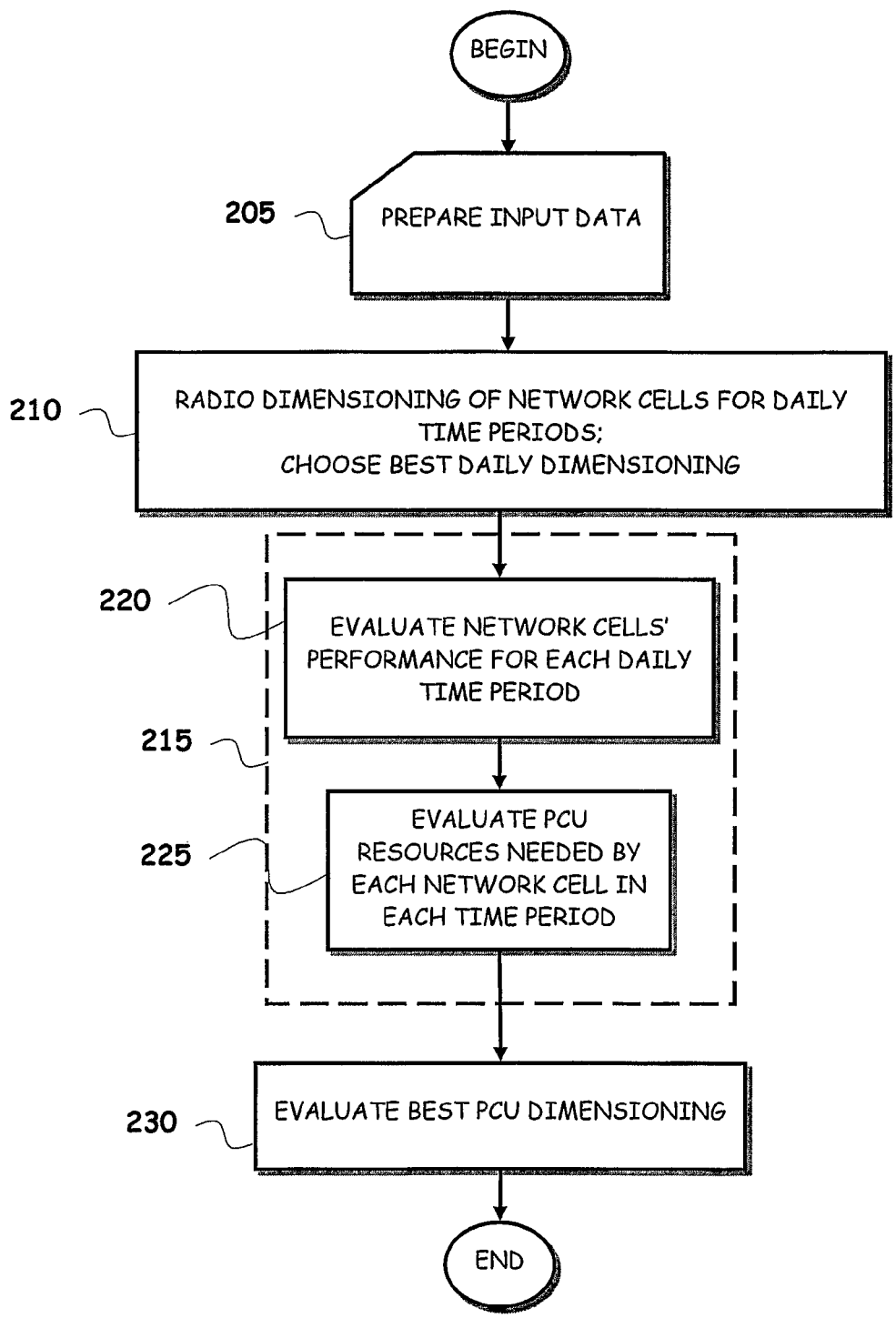
FIGS. 2 to 5 are schematic flowchart showing some steps of a method according to an embodiment of the present invention, for dimensioning a PCU of the GPRS/EDGE part of the GSM/GPRS/EDGE network.

In particular, making reference to the schematic flowchart of FIG. 2, a method according to an embodiment of the present invention includes a first phase (schematized by block 205) in which input data necessary for the PCU dimensioning, particularly the data listed in the foregoing, or part of them, are gathered and prepared for the subsequent processing.

Then (second phase, block 210), for each network cell 110 under control of the BSC to which the PCU being dimensioned is associated, a dimensioning of the radio resources is carried out for the different time periods of the day.

There follows a third phase (block 215) in which, based on the results of the network cell's radio dimensioning performed in the second phase, the resources requested by the cells to the PCU are evaluated. In particular, this phase may include a first sub-phase (block 220) in which the performance of every network cell is evaluated, in the different time periods of the day, as a function of the offered traffic and of the network cell's radio dimensioning resulting from the phase 210; in a second sub-phase (block 225) the PCU resources needed by each network cell in the different time periods are evaluated.

Then, based on the results of the third phase, the best PCU dimensioning is calculated (fourth phase, block 230).

Figure 3:
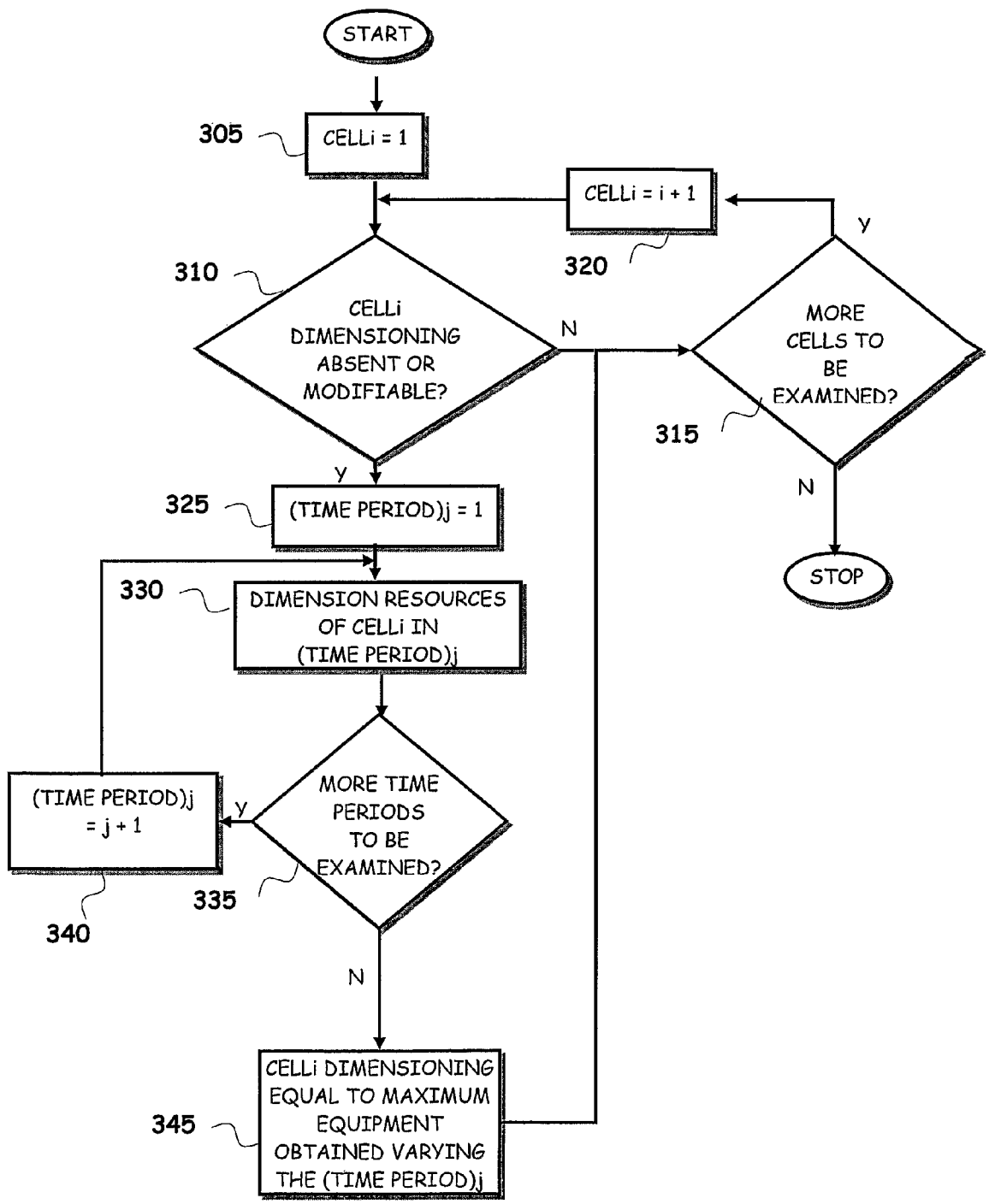

The above-mentioned phases and sub-phases will be hereinafter described in greater detail, making reference to the schematic flowcharts of FIGS. 3 to 5.

In an embodiment of the present invention, the following data are gathered and prepared in the first phase of the dimensioning method (block 205):

data concerning the network cells' configuration, including in particular the number $N_{cells}$ of network cells 110 under control of the BSC 125 to which the PCU being dimensioned is associated, the number $E_t$ of radio carriers installed in those network cells whose equipment is known (i.e., it has been determined in advance) and is not susceptible of being modified, configuration data of the resources of each network cell (the number $N_{TSS,i}$ of PDCHs statically assigned to the data traffic in the i-th cell; the number $N_{e,i}$ of PDCHs configured in EDGE mode in the i-th cell, etc., as listed in the foregoing). For example, these data can be obtained from the databases containing the configuration parameters of the already active network apparatuses (the BTSs corresponding to the network cells);

measurement and/or forecast data, including in particular the SR and DR voice traffic $T^v_{i,j,SR}$, $T^v_{i,j,DR}$ (in Erlang) offered to the i-th network cell in the j-th time period, the UL and DL GPRS data traffic $T^{UL}_{i,j,g}$, $T^{DL}_{i,j,g}$ (in Mbph) offered to the i-th network cell in the j-th time period, the UL and DL EDGE data traffic $T^{UL}_{i,j,e}$, $T^{DL}_{i,j,e}$ (in Mbph) offered to the i-th network cell in the j-th time period. These data can be for example obtained exploiting measurement apparatuses present in the network (transforming the set of measures concerning carried traffics in estimation of offered traffics), or based on market estimation/forecasts. The measurement and/or forecast data are preferably arranged in a matrix (referred to as the "offered traffic" matrix):

$$T^{OFF} = \begin{bmatrix} T^v_{1,j,SR} & T^v_{1,j,DR} & T^{UL}_{1,j,g} & T^{DL}_{1,j,g} & T^{UL}_{1,j,e} & T^{DL}_{1,j,e} \\ T^v_{2,j,SR} & T^v_{2,j,DR} & T^{UL}_{2,j,g} & T^{DL}_{2,j,g} & T^{UL}_{2,j,e} & T^{DL}_{2,j,e} \\ \cdots & \cdots & \cdots & \cdots & \cdots & \cdots \\ T^v_{N_{celle},j,SR} & T^v_{N_{celle},j,DR} & T^{UL}_{N_{celle},j,g} & T^{DL}_{N_{celle},j,g} & T^{UL}_{N_{celle},j,e} & T^{DL}_{N_{celle},j,e} \end{bmatrix}^{j=1,N_{fo}}$$

containing the complete set of voice and data offered traffics on a network cell basis (for the total of $N_{cells}$ cells) and for each time period (for a total of $N_{fo}$ time periods);

design data, defined by the network designer; these data include in particular the list of network cells under control of the BSC associated with the PCU being dimensioned, the set of cells in which the installed radio equipment (i.e., the number of radio carriers) is not known or, if it is known, it is susceptible of being modified, the required loss $B^v$ in respect of the offered voice traffic, the required loss $B^d$ in respect of the offered data traffic, the required throughputs $Th^{UL,g}$, $Th^{DL,g}$ (in kbps) in UL and in DL for the offered GPRS data traffic, the required throughputs $Th^{UL,e}$, $Th^{DL,e}$ (in kbps) in UL and in DL for the offered EDGE data traffic (if any), the number $N_{fo}$ of daily time periods for which the offered voice and data traffics are known. These design data are preferably arranged in a vector (referred to as the "required performances" vector) P:

$$P = \{B^v, B^d, Th^{UL,g}, Th^{DL,g}, Th^{UL,e}, Th^{DL,e}\};$$

PCU configuration data, typically provided by the manufacturer(s) of the network equipment; these data include in particular the capacity $C_{PCU}$ in elementary resource unit of the generic elementary PCU board, the number $R_{PCU,g}$ of PCU resources occupied in the PCU by a single GPRS-type connection, the number $R_{PCU,e}$ of PCU resources occupied in the PCU by a single EDGE-type connection.

After having gathered and prepared the input data, particularly arranging them as described above, the second phase (block 210) of the method begins.

Making reference to FIG. 3, a network cell counter i is initialized, e.g. to 1 (block 305); the counter i will be used for iterating the actions described below over all the network cells which are under responsibility of the PCU being dimensioned.

Then, it is verified whether or not, for the generic network cell CELLi under consideration, a radio equipment has already been defined, and, in case the network cell CELLi is found to have an already defined radio equipment, it is ascertained whether or not such a pre-defined equipment is susceptible of being modified (decision block 310); to this purpose, it is ascertained whether the network cell CELLi is in the above-mentioned set of cells in which the installed radio equipment is not known or, if it is known, it is susceptible of being modified. In case the network cell CELLi under consideration is found to have an non-modifiable equipment (exit branch N of decision block 310), the cell CELLi is skipped; it is then checked whether network cells remain to be considered, i.e., whether or not the counter i has reached the maximum count $N_{cells}$ (decision block 315); in case one or more network cells remain to be considered (exit branch Y of decision block 315), the cell counter i is updated, e.g. increased by one (block 320), and the operation flow jumps back to decision block 310; if instead all the network cells have already been considered (exit branch N of decision block 315), the second phase of the PCU dimensioning procedure ends.

Back to decision block 310, let it be assumed that, for the generic i-th cell CELLi under consideration, it is found that either no radio equipment has yet been defined, or that the already-defined radio equipment is susceptible of being modified (exit branch Y of decision block 310). A time period counter j is initialized, e.g. to 1 (block 325). Then, the best resource dimensioning of the network cell CELLi for the j-th time period (TIME PERIOD)J is evaluated (block 330): in particular, the number of radio carriers to be provided for in that cell in respect of that time period is calculated. For the purposes of the present description, by best resource dimensioning of the generic cell for the generic time period there is intended the dimensioning of the optimum number of radio carriers to be installed in the generic cell, considering the generic time period, in order to satisfy, at least in that time period, the required performance for the voice and data traffics. In a way per-se known in the art, the dimensioning may for example be carried out exploiting suitable analytical models, based for example on Markov's chains, using as at least a part of the data listed in the foregoing, for example the offered voice and data (GPRS/EDGE) traffics and the required performances. A best resource dimensioning method for a cell supporting GPRS traffic is for example described in US20040116124A1. It is however pointed out that the present invention is not limited to any specific procedure for determining the best resource dimensioning: this phase may as a matter of fact be considered as optional, because all the network cells may have an already defined, non-modifiable radio equipment.

The operation is repeated, for the cell CELLi under consideration, over all the existing time periods of the day: in particular, after having performed the dimensioning operation in respect of the generic time period (TIME PERIOD)j, it is checked whether there are other time periods to be considered (decision block 335) and, in the affirmative case (exit branch Y of decision block 335), the time period counter j is updated (e.g., it is increased by one—block 340), and the next time period is taken into consideration, for performing the cell's resource dimensioning in the new time period (as pictorially indicated by the operation flow jumping back to block 330).

When the cell's resource dimensioning has been evaluated for all the existing time periods (exit branch N of decision block 335), the best radio resources dimensioning for the generic network cell is calculated, picking up the maximum among the resources dimensioning calculated for the different time periods (block 345): the best radio equipment for the i-th cell CELLi is thus determined to be:

$$E_i = \max_{j \in [1, N_{fo}]} \{E_{i,j}\}$$

where $E_{i,j}$ is the best radio equipment (i.e., the number of radio carriers to be provided for) calculated for the cell i-th, in the time period j-th.

The operation flow jumps back to decision block 315, and the operations are repeated on the remaining network cells.

When all the network cells have been considered, the second phase 210 of the method ends. It is pointed out that, after having completed the second phase 210, all the network cells under control of the BSC with which the PCU being dimensioned is associated are characterized by a respective, specific radio equipment, in terms of number of radio carriers to be provided for; such radio equipment may either have been defined in advance, and be non-modifiable, or, if not defined in advance, or if modifiable, the cells' radio equipment has been determined in the second phase 210).

The third phase of the method then begins. As mentioned in the foregoing, in this phase the potential degree of occupation of the PCU being dimensioned by each cell under control of the BSC to which the PCU is associated is evaluated. To this purpose, a radio equipments vector E is exploited:

$$E = [E_1, E_2, E_3, \ldots, E_{N_{cells}}]$$

wherein the generic vector element $E_i$ denotes the radio equipment of the i-th cell (i.e., the number of radio carriers installed in that cell, pre-defined or determined during the second phase 210, as described before).

Figure 4:
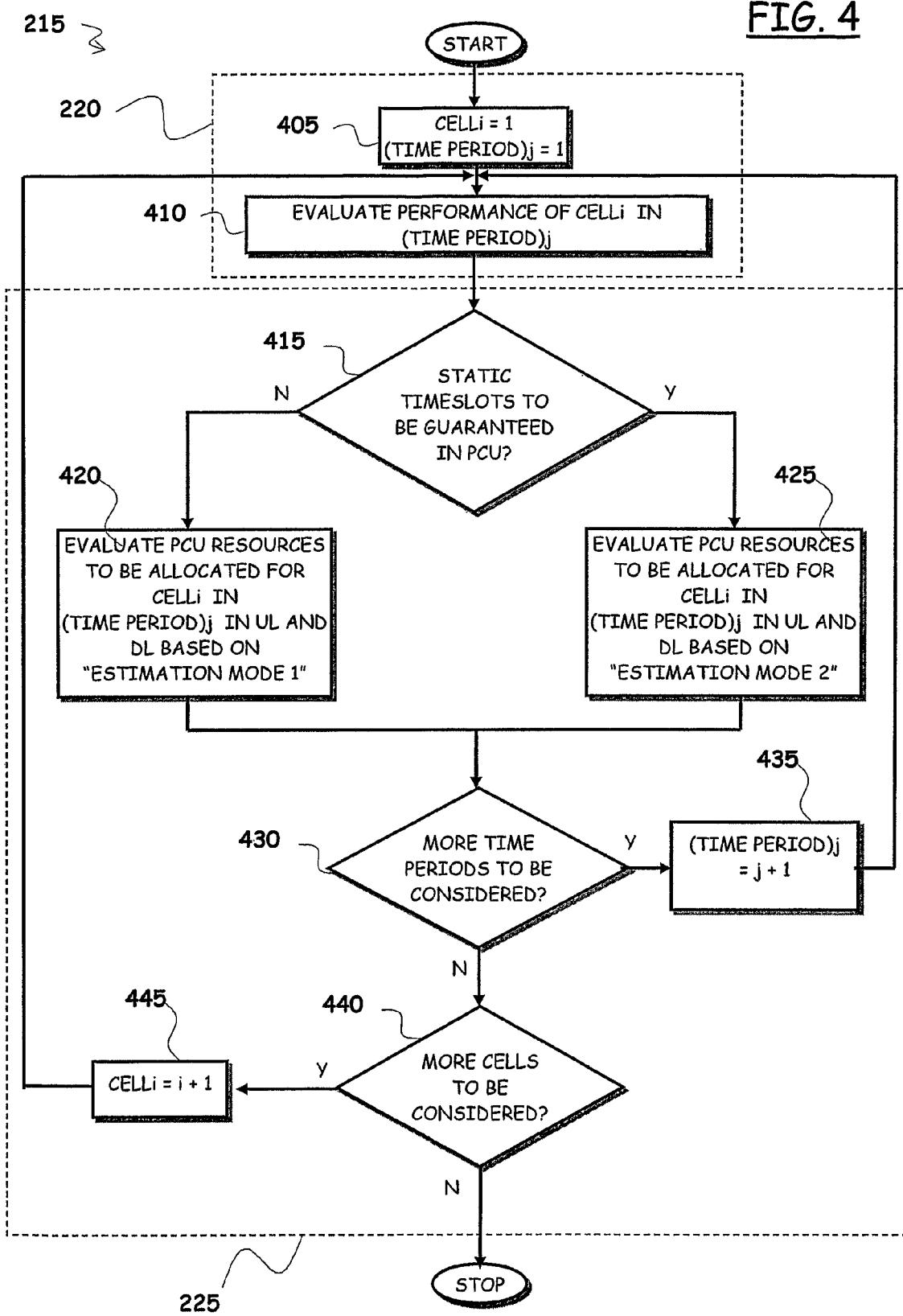
Figure 5:
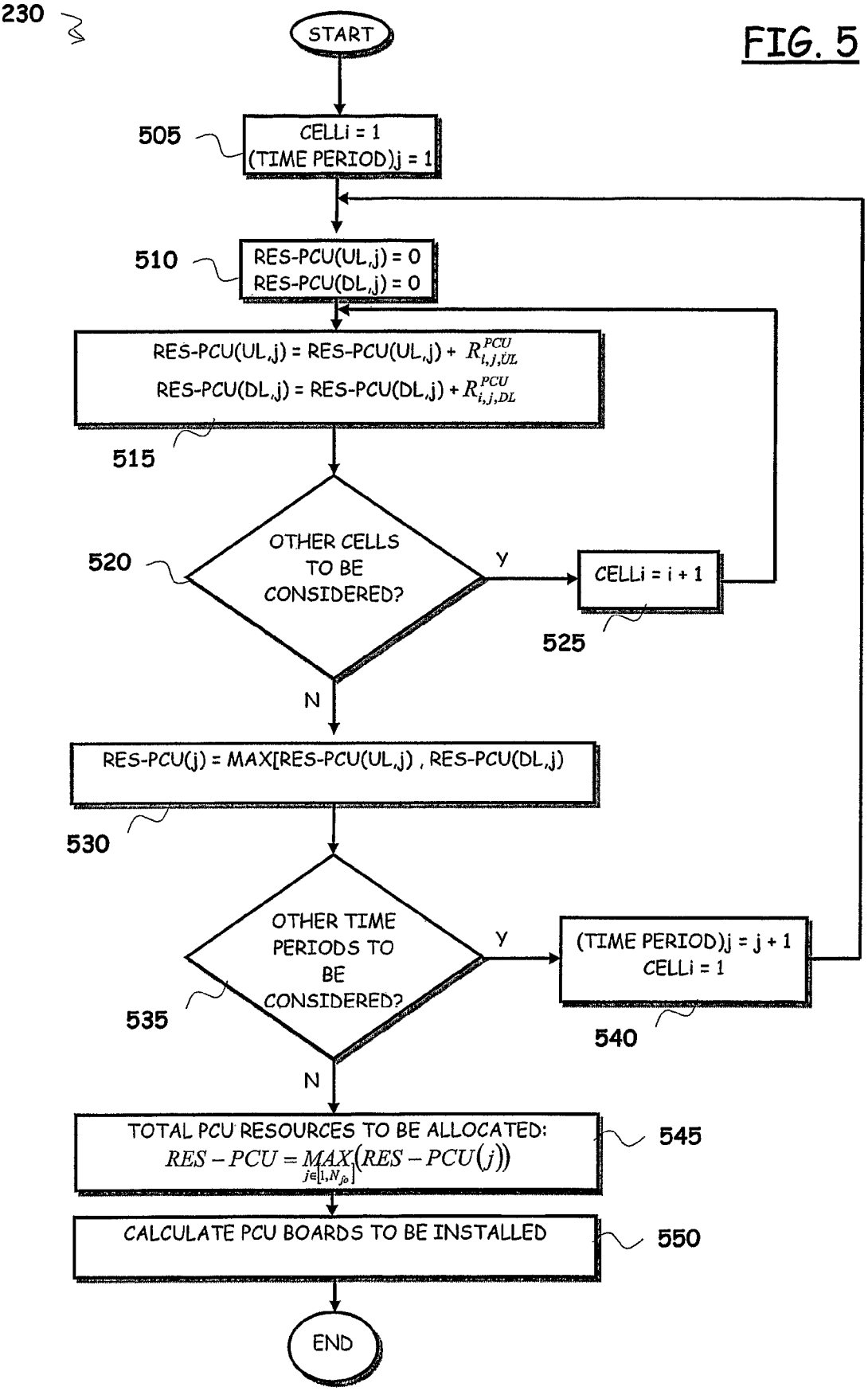

Making reference to FIG. 4, firstly, a cell counter i and a time period counter j, used to scan the cells and, respectively, the time periods, are initialized, e.g. to 1 (block 405).

Then (block 410), for the generic, i-th cell CELLi, and for the generic, j-th time period (TIME PERIOD)j, the respective performances are evaluated.

Similarly to the radio resource dimensioning discussed in the foregoing, the performances of the i-th cell, in the generic j-th time period, are evaluated exploiting suitable analytical models, based for example on Markov's chains, using as at least a part of the data listed in the foregoing, in particular data including the radio equipment of that cell, i.e. the number of radio carriers installed (which can either be the predefined, non-modifiable radio equipment, or the radio equipment determined during the cells' resource dimensioning phase), the traffic offered to the cells, particularly the SR and DR voice traffics $T^v_{i,j,SR}$, $T^v_{i,j,DR}$ offered to the i-th network cell in the j-th time period, the UL and DL GPRS data traffic $T^{UL}_{i,j,g}$, $T^{DL}_{i,j,g}$ offered to the i-th network cell in the j-th time period, the UL and DL EDGE data traffic $T^{UL}_{i,j,e}$, $T^{DL}_{i,j,e}$ offered to the i-th network cell in the j-th time period.

In particular, and just by way of example, the cells' performances may be evaluated exploiting the cells' resource dimensioning method disclosed in the already cited US 2004/0116124; in particular, while for calculating the generic cell's dimensioning the analytical model is iteratively applied, applying the same set of input data and varying the cell's resources, until the obtained cell's performances fulfil the target required performances, in this phase the model is applied once, feeding the set of input data and obtaining in output an estimation of the cell's performances.

The cell's performance evaluation provides data including the voice traffic loss $B^v_{i,j}$, the data traffic loss $B^d_{i,j}$, the throughputs in UL and in DL for the GPRS data traffic $Th_{i,j}^{UL,g}$, $Th_{i,j}^{DL,g}$ and the throughputs in UL and in DL for the EDGE data traffic $Th_{i,j}^{UL,e}$, $Th_{i,j}^{DL,e}$, all these quantities being evaluated in respect of the generic i-th cell, and of the generic j-th time period; the evaluated quantities can be arranged in an evaluated performance vector $P_{i,j}$:

$$P_{i,j} = [B^v_{i,j}, B^d_{i,j}, Th_{i,j}^{UL,g}, Th_{i,j}^{DL,g}, Th_{i,j}^{UL,e}, Th_{i,j}^{DL,e}]$$

As a result of the cell's performance evaluation, in addition to the performance vector $P_{i,j}$, a distribution of probabilities of occupation of the PDCHs available in the considered cell by the GPRS/EDGE traffic is also derived, and the probabilities can for example be arranged in the form of a probabilities vector $D_{i,j}^{PDCH}$ (one for each time period):

$$D_{i,j}^{PDCH} = [D_{i,j}^{PDCH}(0), D_{i,j}^{PDCH}(1), \ldots, D_{i,j}^{PDCH}(N_i^{PDCH})]$$

where $D_{i,j}^{PDCH}(k)$ denotes the probability ($0 \leq D_{i,j}^{PDCH}(k) \leq 1$) that the GPRS/EDGE traffic occupies k PDCHs, and $N_i^{PDCH}$ is the maximum number of PDCHs usable in the i-th cell for GPRS/EDGE traffic.

Figure 6:
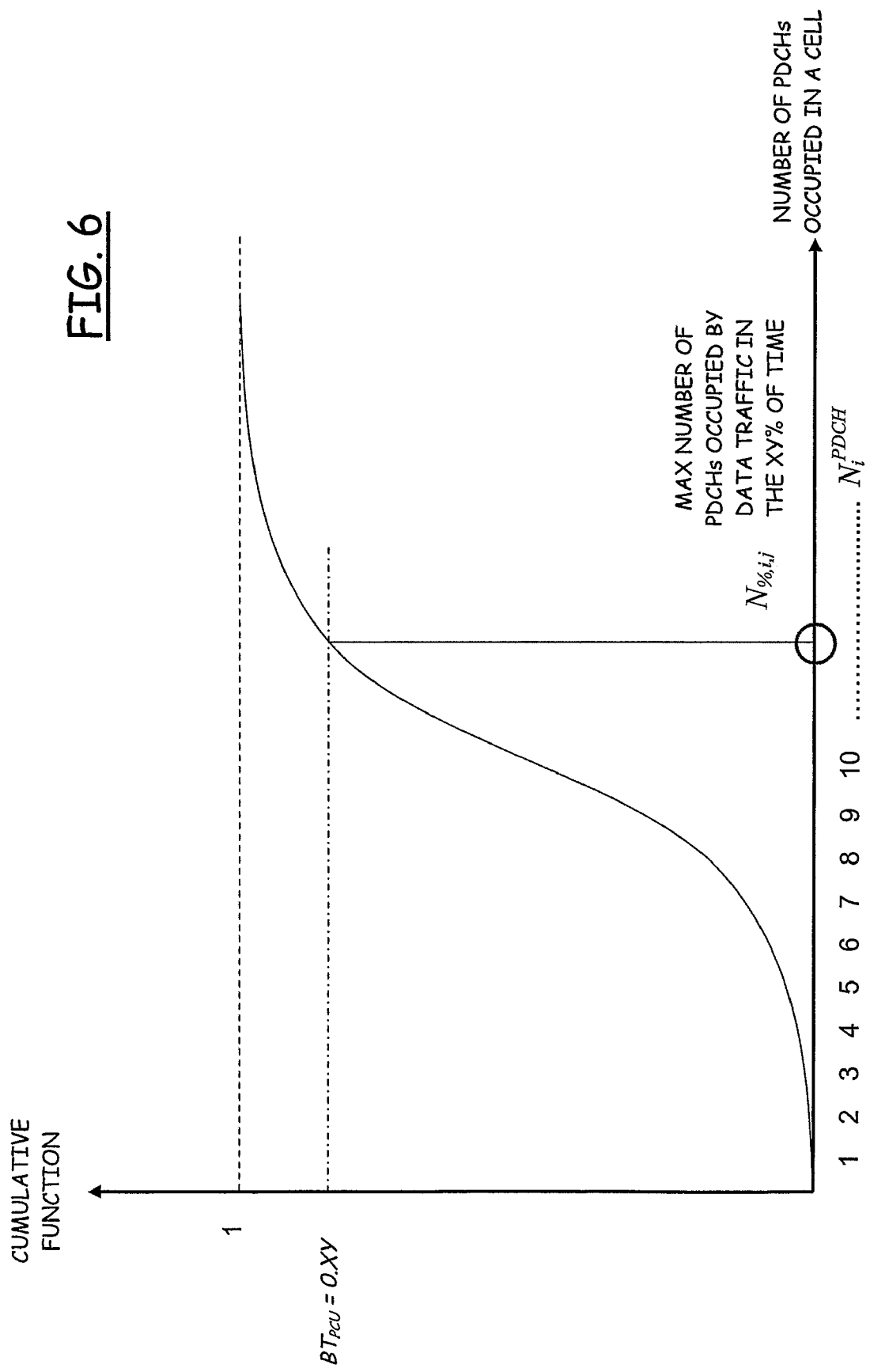
FIG. 6 is a diagram illustrating a cumulative probability of occupation of PDCHs in a generic network cell, and in a generic time period, in an embodiment of the present invention.

For each one of the probabilities vectors $D_{i,j}^{PDCH}$, an associated probability distribution can be determined, as depicted in FIG. 6. In particular, the diagram of FIG. 6 reports in abscissa the number of PDCHs occupied in the generic cell (from 0 to the maximum number of PDCHs exploitable for GPRS/EDGE traffic) and, in ordinate, the occupation probability distribution $CF_{i,j}^{PDCH}$, which is a cumulative function (ranging from 0 to 1) obtained cumulating the probabilities $D_{i,j}^{PDCH}(0)$ to $D_{i,j}^{PDCH}(N_i^{PDCH})$. For example, the value of the occupation probability distribution $CF_{i,j}^{PDCH}$ for a number k of PDCHs is equal to:

$$CF_{i,j}^{PDCH}(k) = \sum_{s=0}^{k} D_{i,j}^{PDCH}(s).$$

It is pointed out that the curve depicted in FIG. 6 is actually the result of an interpolation of discrete values, corresponding to the probabilities $D_{i,j}^{PDCH}(0)$ to $D_{i,j}^{PDCH}(N_i^{PDCH})$.

According to an embodiment of the present invention, in order to estimate the PCU resources needed, the way static PDCHs of the i-th cell CELLi are handled in the PCU is established; static PDCHs are meant to include PDCHs that are reserved for data traffic. In particular, it is ascertained whether or not static PDCHs of the i-th cell have to be guaranteed (decision block 415), in a proportion one-to-$R_{PCU,g}$ in case of GPRS-type PDCHs and one-to $R_{PCU,e}$ in case of EDGE-type PDCHs.

In the case static PDCHs need not to be guaranteed in the PCU (exit branch N of decision block 415), the resources to be allocated in the PCU are estimated according to a first estimation mode ("estimation mode 1", block 420).

In particular, referring to the diagram of FIG. 6, a value of the cumulative function $CF_{i,j}^{PDCH}$ equal to the busy time $BT_{PCU}$ selected by the designer is taken; the number $N_{\%,i,j}$ of PDCHs that corresponds to that value of the cumulative function is determined. The number $N_{\%,i,j}$ of PDCHs determined by means of the curve of FIG. 6 has the following meaning: the number of PDCHs occupied by GPRS/EDGE traffic connections in the cell under consideration, is less or equal to $N_{\%,i,j}$ for a percentage of the time (in the considered time period) equal to the busy time $BT_{PCU}$. A higher value of the busy time $BT_{PCU}$ implies a higher the number of PDCHs occupied by data traffic and, as a consequence of this, a more conservative dimensioning of the PCU resources: the number of elementary resource units allocated in the PCU increases if the $BT_{PCU}$ value grows; for example, when $BT_{PCU}$ is equal to 100%, the number of elementary resource units allocated in the PCU can be coherent with eq. 1. Therefore, the busy time $BT_{PCU}$ is a parameter available to the designer for setting the desired degree of precision of the PCU dimensioning, i.e. to choose whether the dimensioning process has to be very conservative or not, in other words, this parameter sets the degree of reliability of the dimensioning process (higher values of the busy time $BT_{PCU}$ mean higher degrees of reliability).

Once the number $N_{\%,i,j}$ is calculated, the number $R_{i,j}^{PCU}$ of resources to be allocated in the PCU in respect of the i-th cell CELLi and the j-th time period (TIME PERIOD)j is determined. In particular, separately in UL and DL, and depending on the values taken by the parameters $N_{TSS,i}$ and $N_{e,i}$ and the number $N_{\%,i,j}$, the number $R_{i,j}^{PCU}$ of resources to be allocated in the PCU is evaluated as follows:

if $N_{TSS,i} < N_{e,i} < N_{\%,i,j}$ then $R_{i,j}^{PCU} = N_{e,i} \cdot R_{PCU,e} + (N_{\%,i,j} - N_{e,i}) \cdot R_{PCU,g}$ if $N_{TSS,i} < N_{\%,i,j} < N_{e,i}$ then $R_{i,j}^{PCU} = N_{\%,i,j} \cdot R_{PCU,e}$ if $N_{\%,i,j} < N_{TSS,i} < N_{e,i}$ then $R_{i,j}^{PCU} = N_{\%,i,j} \cdot R_{PCU,e}$ if $N_{e,i} < N_{TSS,i} < N_{\%,i,j}$ then $R_{i,j}^{PCU} = N_{e,i} \cdot R_{PCU,e} + (N_{\%,i,j} - N_{e,i}) \cdot R_{PCU,g}$ if $N_{e,i} < N_{\%,i,j} < N_{TSS,i}$ then $R_{i,j}^{PCU} = N_{e,i} \cdot R_{PCU,e} + (N_{\%,i,j} - N_{e,i}) \cdot R_{PCU,g}$ if $N_{\%,i,j} < N_{e,i} < N_{TSS,i}$ then $R_{i,j}^{PCU} = N_{\%,i,j} \cdot R_{PCU,e}$ if $(N_{e,i} = N_{TSS,i}) < N_{\%,i,j}$ then $R_{i,j}^{PCU} = N_{e,i} \cdot R_{PCU,e} + (N_{\%,i,j} - N_{e,i}) \cdot R_{PCU,g}$ if $N_{\%,i,j} < (N_{e,i} = N_{TSS,i})$ then $R_{i,j}^{PCU} = N_{\%,i,j} \cdot R_{PCU,e}$ In other words, the number $R_{i,j}^{PCU}$ of PCU's elementary resource units depends only on the number $N_{\%,i,j}$ in case the number $N_{\%,i,j}$ is lower than the value $N_{e,i}$; otherwise, the number $R_{i,j}^{PCU}$ of PCU's elementary resource units depends also on the parameters $N_{TSS,i}$ and $N_{e,i}$.

Back to decision block 415, in the case static PDCHs need to be guaranteed in the PCU (exit branch Y), the resources to be allocated in the PCU are estimated according to a second estimation mode ("estimation mode 2", block 425). As in the first estimation mode described above, using the diagram of FIG. 6 the maximum number $N_{\%,i,j}$ of PDCH channels occupied by the GPRS/EDGE traffic is evaluated, based on the busy time $BT_{PCU}$. Then, taking into account the number $N_{TSS,i}$ of PDCHs statically assigned to the data traffic, and the number $N_{e,i}$ of PDCHs configured in EDGE mode, the number $R_{i,j}^{PCU}$ of resources to be allocated in the PCU in respect of the i-th cell CELLi and the j-th time period (TIME PERIOD)j is determined. In particular, separately in UL and DL, and depending on the values taken by the parameters $N_{TSS,i}$ and $N_{e,i}$ and on the maximum number $N_{\%,i,j}$ of PDCHs occupied, the resources $R_{i,j}^{PCU}$ to be allocated are evaluated as follows:

if $N_{TSS,i} < N_{e,i} < N_{\%,i,j}$ then $R_{i,j}^{PCU} = N_{e,i} \cdot R_{PCU,e} + (N_{\%,i,j} - N_{e,i}) \cdot R_{PCU,g}$ if $N_{TSS,i} < N_{\%,i,j} < N_{e,i}$ then $R_{i,j}^{PCU} = N_{\%,i,j} \cdot R_{PCU,e}$ if $N_{\%,i,j} < N_{TSS,i} < N_{e,i}$ then $R_{i,j}^{PCU} = N_{TSS,i} \cdot R_{PCU,e}$ if $N_{e,i} < N_{TSS,i} < N_{\%,i,j}$ then $R_{i,j}^{PCU} = N_{e,i} \cdot R_{PCU,e} + (N_{\%,i,j} - N_{e,i}) \cdot R_{PCU,g}$ if $N_{e,i} < N_{\%,i,j} < N_{TSS,i}$ then $R_{i,j}^{PCU} = N_{e,i} \cdot R_{PCU,e} + (N_{TSS,i} - N_{e,i}) \cdot R_{PCU,g}$ if $N_{\%,i,j} < N_{e,i} < N_{TSS,i}$ then $R_{i,j}^{PCU} = N_{e,i} \cdot R_{PCU,e} + (N_{TSS,i} - N_{e,i}) \cdot R_{PCU,g}$ if $(N_{e,i} = N_{TSS,i}) < N_{\%,i,j}$ then $R_{i,j}^{PCU} = N_{e,i} \cdot R_{PCU,e} + (N_{\%,i,j} - N_{e,i}) \cdot R_{PCU,g}$ if $N_{\%,i,j} < (N_{e,i} = N_{TSS,i})$ then $R_{i,j}^{PCU} = N_{TSS,i} \cdot R_{PCU,e}$ It can be appreciated that, compared to the first estimation mode, the PCU's resources are calculated on the basis of the number $N_{TSS,i}$ of static PDCHs in all those cases in which the number $N_{\%,i,j}$ of PDCHs determined on the basis of the busy time $BT_{PCU}$ results to be lower than the number $N_{TSS,i}$ of static PDCHs to be guaranteed.

The above operations are repeated for every time period (decision block 430, exit branch Y, block 435, incrementing the time period counter j), until there are no more time periods left to be considered in respect of the i-th cell (exit branch N of decision block 430), and for every cell (decision block 440, exit branch Y, block 445, incrementing the cell counter i), until all the cells have been considered (exit branch N of decision block 440). The third phase of the dimensioning method then ends.

After the completion of the third phase, the complete set of resources required to the PCU by each network cell in each time period of the day is known: this set can be described by a "required resources" matrix $R_{i,j}^{PCU}$:

$$R_{i,j}^{PCU} = \begin{bmatrix} R_{1,1,k}^{PCU} & R_{1,2,k}^{PCU} & R_{1,3,k}^{PCU} & \cdots & R_{1,N_{fo},k}^{PCU} \\ R_{2,1,k}^{PCU} & R_{2,2,k}^{PCU} & R_{2,3,k}^{PCU} & \cdots & R_{2,N_{fo},k}^{PCU} \\ R_{3,1,k}^{PCU} & R_{3,2,k}^{PCU} & \cdots & \cdots & \cdots \\ \cdots & \cdots & \cdots & \cdots & \cdots \\ R_{N_{celle},1,k}^{PCU} & R_{N_{celle},2,k}^{PCU} & R_{N_{celle},3,k}^{PCU} & \cdots & R_{N_{celle},N_{fo},k}^{PCU} \end{bmatrix}^{k \in [UL,DL]}$$

In the fourth phase 230 of the method, the PCU is dimensioned. To this purpose, making reference to schematic flowchart of FIG. 5, the cell counter i and the time period counter j are firstly initialized, e.g. both to 1 (block 505).

Resource counters are then defined: in particular, two resource counters are defined, a first resource counter RES-PCU(UL,j) being defined in respect of the resources to be allocated in the PCU for the UL in the j-th time period, and a second resource counter RES-PCU(DL,j) being defined in respect of the resources to be allocated in the PCU for the DL in the j-th time period. These two resource counters are initialized to, e.g., zero (block 510).

The two resource counters RES-PCU(UL,j) and RES-PCU(DL,j) are then updated (incremented) by adding the resource values, picked up from the required resources matrix $R_{i,j}^{PCU}$, corresponding to that cell CELLi and that time period (TIME PERIOD)j, according to the following formulas:

RES-PCU(UL,j)=RES-PCU(UL,j)+$R_{i,j,UL}^{PCU}$

RES-PCU(DL,j)=RES-PCU(DL,j)+$R_{i,j,DL}^{PCU}$ (block 515).

The above operation is performed for all the network cells (decision block 520, exit branch Y, and block 525, incrementing the cell counter i), until no more cells remain to be considered (exit branch N of decision block 520).

Then, the maximum between the two resource counters RES-PCU(UL,j), RES-PCU(DL,j) (for the UL and the DL) is taken, and the value is stored, assigning the value to a variable RES-PCU(j) (block 525).

The above operations are repeated for all the time periods of the day (decision block 535, exit branch Y, and block 540, incrementing the time period counter j), until no more time periods remain to be considered (exit branch N of decision block 535).

The overall PCU resources to be allocated are then calculated (block 545), taking the maximum among the calculated resources for the different time periods of the day; defined as RES-PCU the total elementary resource units to be allocated in the PCU, it is:

$$RES-PCU = \max_{j \in [1,N_{fo}]} (RES-PCU(j)).$$

In an embodiment of the present invention, there follows an evaluation phase of the total number $N_{boards}$ of PCU boards to be installed in the PCU (block 550):

$$N_{boards} = \left\lceil \frac{RES-PCU}{C_{PCU}} \right\rceil$$

The PCU has thus been dimensioned, and the dimensioning procedure then ends.

Summarizing, the described method allows carrying out a more realistic dimensioning the generic PCU of a GPRS/EDGE network, based on information including:

the configuration data of the network cells' under control of the BSC to which the PCU being dimensioned is associated; such configuration data include the number of radio carriers installed in the network cells, users' multiplexing parameters and activation threshold for the DR resources; these configuration data can be derived from the databases of the network apparatuses;

measurement and/or forecast data, including measurement and/or forecast data about the offered voice traffic in SR and DR coding, and the offered GPRS and EDGE data traffic in UL and DL; these data can be derived from measurement apparatuses in the network, or from estimation/market analysis;

design data (voice and data losses, required GPRS and EDGE throughputs in UL and DL, number of daily time periods, busy time based on which the PCU resources required by each cell are evaluated); these data can be provided by the designer.

The described method may be used for determining the number of boards of elementary resource units to be installed in the PCU for the control of the PDCHs in the GSM radio frame on which one or more GPRS/EDGE connections are set up, in those cases wherein the network apparatus manufacturers make the PCU elementary resource units available not individually, but in boards including each a predefined number of such elementary resource units. Thanks to the described method, the PCU dimensioning is performed properly taking into account the effective load of the network and, in particular, the effective occupation extent, by the data traffic, of the radio resources allocated to the different cells under control of the considered BSC. Thanks to this, it is possible to avoid an unnecessary over-dimensioning of the PCU resources, as it would occur simply dimensioning the PCU on the basis of the maximum number of PDCHs per cell usable for data connections.

In the following, two examples are provided that show the advantages of the described method over the known approaches.

Example 1

It is assumed that the PCU to be dimensioned is responsible of five network cells. The input data for the PCU dimensioning method are reported in the following tables:

|  | Cell 1 | Cell 2 | Cell 3 | Cell 4 | Cell 5 |
| --- | --- | --- | --- | --- | --- |
| Total Time Slots (total radio channels) | 8 | 16 | 16 | 24 | 24 |
| Signalling Time Slot (radio channels reserved for signalling) | 1 | 2 | 2 | 2 | 2 |
| Static PDCH | 2 | 2 | 2 | 2 | 2 |

-continued

|  | Cell 1 | Cell 2 | Cell 3 | Cell 4 | Cell 5 |
|---|---|---|---|---|---|
| EDGE PDCH | 4 | 4 | 4 | 4 | 4 |
| Single Rate Voice Traffic (in Erlang) | 3 | 6 | 6 | 12 | 5 |
| Dual Rate Voice Traffic (in Erlang) | 3 | 6 | 6 | 12 | 5 |
| Dual Rate Activation Threshold | 70% | 70% | 70% | 70% | 70% |
| GPRS Traffic in UL Section (in Mbph) | 9 | 12 | 20 | 45 | 50 |
| GPRS Traffic in DL Section (in Mbph) | 0 | 0 | 0 | 0 | 0 |
| EDGE Traffic in UL Section (in Mbph) | 9 | 12 | 20 | 45 | 50 |
| EDGE Traffic in DL Section (in Mbph) | 0 | 0 | 0 | 0 | 0 |
| Max. Number of Users that can be multiplexed on a PDCH | 3 | 3 | 3 | 3 | 3 |
| Mobile terminal capability in UL Section | 2 | 2 | 2 | 2 | 2 |
| Mobile terminal capability in DL Section | 4 | 4 | 4 | 4 | 4 |
| GPRS Coding Scheme | CS-2 | CS-2 | CS-2 | CS-2 | CS-2 |
| GPRS Bit Rate per PDCH | 10 | 10 | 10 | 10 | 10 |
| EDGE Modulation & Coding Scheme | MCS-6 | MCS-6 | MCS-6 | MCS-6 | MCS-6 |
| EDGE Bit Rate per PDCH | 24 | 24 | 24 | 24 | 24 |

| | |
|---|---|
| $N_{Fo}$ | 1 |
| $R_{PCU,g}$ | 1 |
| $R_{PCU,e}$ | 1 |
| Static PDCHs | Not reserved in PCU |
| Busy Time (%) | 70% (case (a)) |
| | 90% (case (b)) |

The occupation probabilities of the PDCHs by the GPRS/EDGE traffic, obtained by evaluating the cells' performances, using for example the method disclosed in US 2004/0116124, are:

Probability Distribution of Cell 1

| Used PDCHs | PDCHs occupation probability | Cumulative distribution |
|---|---|---|
| 0 | 14.15 | 14.15 |
| 1 | 0 | 14.15 |
| 2 | 47.7 | 61.85 |
| 3 | 23.41 | 85.25 |
| 4 | 12.41 | 97.66 |
| 5 | 1.87 | 99.53 |
| 6 | 0.45 | 99.98 |
| 7 | 0.02 | 100 |

Probability Distribution of Cell 2

| Used PDCHs | PDCHs occupation probability | Cumulative distribution |
|---|---|---|
| 0 | 10.76 | 10.76 |
| 1 | 0 | 10.76 |
| 2 | 29.09 | 39.85 |
| 3 | 14.37 | 54.23 |
| 4 | 24.77 | 79 |
| 5 | 9.49 | 88.49 |
| 6 | 8.31 | 96.8 |
| 7 | 1.82 | 98.62 |
| 8 | 1.13 | 99.75 |
| 9 | 0.17 | 99.92 |
| 10 | 0.07 | 99.99 |
| 11 | 0.01 | 100 |
| 12 | 0 | 100 |
| 13 | 0 | 100 |
| 14 | 0 | 100 |

Probability Distribution of Cell 3

| Used PDCHs | PDCHs occupation probability | Cumulative distribution |
|---|---|---|
| 0 | 0.65 | 0.65 |
| 1 | 0 | 0.65 |
| 2 | 13.2 | 13.86 |
| 3 | 15.37 | 29.23 |
| 4 | 21.17 | 50.4 |
| 5 | 20.44 | 70.84 |
| 6 | 15.94 | 86.78 |
| 7 | 7.62 | 94.4 |
| 8 | 3.99 | 98.39 |
| 9 | 1.13 | 99.52 |
| 10 | 0.4 | 99.92 |
| 11 | 0.07 | 99.99 |
| 12 | 0.01 | 100 |
| 13 | 0 | 100 |
| 14 | 0 | 100 |

Probability Distribution of Cell 4

| Used PDCHs | PDCHs occupation probability | Cumulative distribution |
|---|---|---|
| 0 | 0 | 0 |
| 1 | 0 | 0 |
| 2 | 13.44 | 13.44 |
| 3 | 14.9 | 28.34 |
| 4 | 15.56 | 43.9 |
| 5 | 15.23 | 59.14 |
| 6 | 13.94 | 73.07 |
| 7 | 12 | 85.07 |
| 8 | 7.28 | 92.35 |
| 9 | 4.02 | 96.37 |
| 10 | 2.04 | 98.42 |
| 11 | 0.95 | 99.37 |
| 12 | 0.4 | 99.77 |
| 13 | 0.15 | 99.93 |
| 14 | 0.05 | 99.98 |
| 15 | 0.02 | 99.99 |
| 16 | 0 | 100 |
| 17 | 0 | 100 |
| 18 | 0 | 100 |
| 19 | 0 | 100 |
| 20 | 0 | 100 |
| 21 | 0 | 100 |
| 22 | 0 | 100 |

Probability Distribution of Cell 5

| Used PDCHs | PDCHs occupation probability | Cumulative distribution |
|---|---|---|
| 0 | 0 | 0 |
| 1 | 0 | 0 |
| 2 | 0.03 | 0.03 |
| 3 | 0.09 | 0.12 |
| 4 | 0.26 | 0.38 |
| 5 | 0.66 | 1.04 |
| 6 | 1.62 | 2.66 |
| 7 | 3.66 | 6.33 |
| 8 | 5.46 | 11.78 |
| 9 | 7.58 | 19.36 |
| 10 | 9.79 | 29.15 |
| 11 | 11.68 | 40.83 |
| 12 | 12.79 | 53.62 |
| 13 | 12.74 | 66.36 |
| 14 | 11.44 | 77.8 |
| 15 | 9.12 | 86.91 |
| 16 | 6.38 | 93.29 |
| 17 | 3.81 | 97.1 |
| 18 | 1.9 | 99 |
| 19 | 0.74 | 99.74 |
| 20 | 0.21 | 99.96 |
| 21 | 0.04 | 100 |
| 22 | 0 | 100 |

The table below reports, for each of the cells, the maximum number of theoretically usable PDCHs, vs. the number of used PDCHs calculated using the cumulative distribution above for the two possible busy time values:

| Cell | Max number of usable PDCHs | Max number of PDCHs used for Busy Time = 70% | Max number of PDCHs used for Busy Time = 90% |
|---|---|---|---|
| 1 | 8 | 3 | 4 |
| 2 | 16 | 4 | 6 |
| 3 | 16 | 5 | 7 |
| 4 | 24 | 6 | 8 |
| 5 | 24 | 14 | 16 |

The results of the PCU dimensioning adopting the two empirical approaches reassumed by eq. 1 and eq. 2 and the method according to the described embodiment of the invention are the following:

case (a): busy time = 70%:

| | |
|---|---|
| method based on eq. 1: | 88 PCU elementary resource units |
| method based on eq. 2 ($\alpha = 0.75$): | 66 PCU elementary resource units |
| method of the invention: | 32 PCU elementary resource units | case (b): busy time = 90%:

| | |
|---|---|
| method based on eq. 1: | 88 PCU elementary resource units |
| method based on eq. 2 ($\alpha = 0.75$): | 66 PCU elementary resource units |
| method of the invention: | 41 PCU elementary resource units |

Thus, in both cases the conventional approaches (which do not perceive any difference in the two scenarios) lead to a waste of PCU resources, i.e. the PCU is over-dimensioned.

Even worse, in some cases the conventional approaches may lead to an underestimation of the PCU resources actually needed, as in Example 2 reported below.

Example 2

It is again assumed that the PCU to be dimensioned is responsible of five network cells The input data for the PCU dimensioning method are reported in the following tables:

| | Cell 1 | Cell 2 | Cell 3 | Cell 4 | Cell 5 |
|---|---|---|---|---|---|
| Total Time Slots (total radio channels) | 8 | 16 | 16 | 24 | 24 |
| Signalling Time Slot (radio channels reserved for signalling) | 1 | 2 | 2 | 2 | 2 |
| Static PDCH | 2 | 2 | 2 | 2 | 2 |
| EDGE PDCH | 4 | 4 | 4 | 4 | 4 |
| Single Rate Voice Traffic (in Erlang) | 1 | 2 | 3 | 3 | 1 |
| Dual Rate Voice Traffic (in Erlang) | 1 | 2 | 3 | 3 | 1 |
| Dual Rate Activation Threshold | 70% | 70% | 70% | 70% | 70% |
| GPRS Traffic in UL Section (in Mbph) | 50 | 60 | 52 | 70 | 85 |
| GPRS Traffic in DL Section (in Mbph) | 0 | 0 | 0 | 0 | 0 |
| EDGE Traffic in UL Section (in Mbph) | 50 | 60 | 52 | 70 | 85 |
| EDGE Traffic in DL Section (in Mbph) | 0 | 0 | 0 | 0 | 0 |
| Max. Number of Users that can be multiplexed on a PDCH | 3 | 3 | 3 | 3 | 3 |
| Mobile terminal capability in UL Section | 2 | 2 | 2 | 2 | 2 |
| Mobile terminal capability in DL Section | 4 | 4 | 4 | 4 | 4 |
| GPRS Coding Scheme | CS-2 | CS-2 | CS-2 | CS-2 | CS-2 |
| GPRS Bit Rate per PDCH | 10 | 10 | 10 | 10 | 10 |
| EDGE Modulation & Coding Scheme | MCS-6 | MCS-6 | MCS-6 | MCS-6 | MCS-6 |
| EDGE Bit Rate per PDCH | 24 | 24 | 24 | 24 | 24 |

| | |
|---|---|
| $N_{Fo}$ | 1 |
| $R_{PCU,g}$ | 1 |
| $R_{PCU,e}$ | 1 |
| Static PDCHs | Not reserved in PCU |
| Busy Time (%) | 70% (case (a)) |
| | 90% (case (b)) |

The occupation probabilities of the PDCHs by the GPRS/EDGE traffic, obtained by evaluating the cells' performances, using for example the method disclosed in US 2004/0116124, are:

Probability Distribution of Cell 1

| Used PDCHs | PDCHs occupation probability | Cumulative distribution |
|---|---|---|
| 0 | 0 | 0 |
| 1 | 0 | 0 |
| 2 | 2.82 | 2.82 |
| 3 | 9.64 | 12.45 |
| 4 | 18.75 | 31.21 |
| 5 | 27.7 | 58.91 |
| 6 | 27.45 | 86.35 |
| 7 | 13.65 | 100 |

Probability Distribution of Cell 2

| Used PDCHs | PDCHs occupation probability | Cumulative distribution |
|---|---|---|
| 0 | 0 | 0 |
| 1 | 0 | 0 |
| 2 | 0.02 | 0.02 |
| 3 | 0.1 | 0.12 |
| 4 | 0.39 | 0.51 |
| 5 | 1.36 | 1.87 |
| 6 | 3.02 | 4.89 |
| 7 | 6 | 10.89 |
| 8 | 10.47 | 21.36 |
| 9 | 15.68 | 37.04 |
| 10 | 19.58 | 56.62 |
| 11 | 19.56 | 76.18 |
| 12 | 14.66 | 90.84 |
| 13 | 7.33 | 98.17 |
| 14 | 1.83 | 100 |

Probability Distribution of Cell 3

| Used PDCHs | PDCHs occupation probability | Cumulative distribution |
|---|---|---|
| 0 | 0 | 0 |
| 1 | 0 | 0 |
| 2 | 0.42 | 0.42 |
| 3 | 1.21 | 1.63 |
| 4 | 3.18 | 4.81 |
| 5 | 7.45 | 12.27 |
| 6 | 11.01 | 23.28 |
| 7 | 14.48 | 37.76 |
| 8 | 16.7 | 54.46 |
| 9 | 16.54 | 71 |
| 10 | 13.68 | 84.69 |
| 11 | 9.06 | 93.75 |
| 12 | 4.51 | 98.26 |
| 13 | 1.5 | 99.75 |
| 14 | 0.25 | 100 |

Probability Distribution of Cell 4

| Used PDCHs | PDCHs occupation probability | Cumulative distribution |
|---|---|---|
| 0 | 0 | 0 |
| 1 | 0 | 0 |
| 2 | 0 | 0 |
| 3 | 0 | 0 |
| 4 | 0 | 0 |
| 5 | 0.01 | 0.01 |
| 6 | 0.02 | 0.03 |
| 7 | 0.09 | 0.12 |
| 8 | 0.22 | 0.35 |
| 9 | 0.52 | 0.87 |
| 10 | 1.13 | 2 |
| 11 | 2.25 | 4.25 |
| 12 | 4.13 | 8.38 |
| 13 | 6.89 | 15.27 |
| 14 | 10.33 | 25.6 |
| 15 | 13.77 | 39.37 |
| 16 | 16.06 | 55.43 |
| 17 | 16.06 | 71.49 |
| 18 | 13.39 | 84.88 |
| 19 | 8.92 | 93.8 |
| 20 | 4.46 | 98.26 |
| 21 | 1.49 | 99.75 |
| 22 | 0.25 | 100 |

Probability Distribution of Cell 5

| Used PDCHs | PDCHs occupation probability | Cumulative distribution |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 | 0 | 0 |
| 10 | 0 | 0 |
| 11 | 0 | 0 |
| 12 | 0 | 0 |
| 13 | 0.02 | 0.02 |
| 14 | 0.09 | 0.11 |
| 15 | 0.34 | 0.45 |
| 16 | 1.2 | 1.66 |
| 17 | 3.61 | 5.27 |
| 18 | 9.02 | 14.29 |
| 19 | 18.04 | 32.33 |
| 20 | 27.07 | 59.4 |
| 21 | 27.07 | 86.47 |
| 22 | 13.53 | 100 |

The table below reports, for each of the cells, the maximum number of theoretically usable PDCHs, vs. the number of used PDCHs calculated using the cumulative distribution above for the two possible busy time values:

| Cell | Max number of usable PDCHs | Max number of PDCHs used for Busy Time = 70% | Max number of PDCHs used for Busy Time = 90% |
|---|---|---|---|
| 1 | 8 | 5 | 6 |
| 2 | 16 | 11 | 12 |
| 3 | 16 | 9 | 11 |
| 4 | 24 | 17 | 19 |
| 5 | 24 | 21 | 22 |

The results of the PCU dimensioning adopting the two empirical approaches reassumed by eq. 1 and eq. 2 and the method according to the described embodiment of the invention are the following:

| case (a): busy time = 70%: | |
| --- | --- |
| method based on eq. 1: | 88 PCU elementary resource units |
| method based on eq. 2 (a = 0.75): | 66 PCU elementary resource units |
| method of the invention: | 63 PCU elementary resource units |
| case (b): busy time = 90%: | |
| method based on eq. 1: | 88 PCU elementary resource units |
| method based on eq. 2 (a = 0.75): | 66 PCU elementary resource units |
| method of the invention: | 70 PCU elementary resource units |

It can be appreciated that, using the conventional approach based on eq. 2, in the last case the PCU dimensioning is underestimated. An underestimation of the PCU resources needed may have the consequence that the probability of not being capable of servicing requests for data connections is drastically increased.

The described method, which can for example be implemented in software running on a suitable data processing apparatus, e.g. a personal computer or a workstation, provides much better results than the conventional approaches to PCU dimensioning. In particular, the described method accounts for the coexistence of the traditional GSM voice traffic and of the GPRS/EDGE data traffic, and thus the actual occupation of both the generic cell's resources (the PDCHs) and the resources of the PCU (the PCU's elementary resource units) by the data connections are taken into account. Also, the method described accounts for the offered voice and data traffic in respect of different hours of the days; by analyzing the voice and data traffic in each one of the different time periods, it is possible to properly evaluate the cells' congestion state in the different times of a day, without having to over-dimension the PCU, as instead would be in the two empirical approaches previously discussed. GPRS and EDGE radio resources of the generic cell can be treated in a differentiated manner; this allows taking into account that the PDCHs exploitable by EDGE or GPRS connections not necessarily requires the association of a same number of PCU elementary resource units. Statically and dynamically configured PDCHs can also be treated in a differentiated manner; this allows taking into account that in some cases static PDCHs is to be guaranteed (i.e., there are PCU resources that need to be permanently allocated), irrespective of the fact that they are actually engaged by data connections. The accuracy in the dimensioning of the PCU's resources can be made to vary depending on the needs of the network designer. In fact, a higher value of the busy time parameter $BT_{PCU}$ implies a higher number of occupied PDCHs in the set of cells under responsibility of the PCU being dimensioned and, therefore, higher values of the set of values $R_{i,j}^{PCU}$ and a more conservative dimensioning process.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. A method of dimensioning a data packets handler apparatus in a mobile communications network comprising a plurality of cells, each one providing mobile communications coverage in a respective geographic area, said mobile communications network supporting packet-switched traffic, wherein the data packets handler apparatus to be dimensioned is associated with at least one cell of the mobile communications network, comprising:
   obtaining an indication of radio communications resources of the at least one cell;
   obtaining a first indication of packet-switched traffic transmitted by the at least one cell to at least one communication terminal;
   obtaining a second indication of packet-switched traffic received by the at least one cell from at least one mobile communication terminal; and
   determining an amount of resources of the data packets handler apparatus potentially needed by the at least one cell for handling the packet-switched traffic based on:
      the indication of radio communications resources,
      the packet-switched traffic associated with the at least one cell, and
      probabilities of occupation of the radio communication resources of the at least one cell by the packet-switched traffic.

2. The method according to claim 1, wherein the first indication of packet-switched traffic and the second indication of packet-switched traffic each comprises respective time-based indications of the packet-switched traffic, each one with respect to a corresponding time period.

3. The method according to claim 1, wherein the mobile communications network further supports circuit-switched traffic, and further comprising obtaining an indication of circuit-switched traffic associated with the at least one cell, wherein the step of determining an amount of data packets handler apparatus resources is based also on the circuit-switched traffic.

4. The method according to claim 3, wherein the indication of circuit-switched traffic comprises at least two respective time-based indications of the circuit-switched traffic, each one with respect to a corresponding time period.

5. The method according to claim 1, wherein at least one of the first indication and the second indication of packet-switched traffic comprises a general packet radio service data traffic indication.

6. The method according to claim 1, wherein at least one of the first indication and the second indication of packet-switched traffic comprises an enhanced data rate for global evolution data traffic indication.

7. The method according to claim 1, wherein the first indication of packet-switched traffic is transmitted by the at least one network cell to a plurality of mobile communication terminals located in the respective geographic area, and the second indication of packet-switched traffic is received by the at least one network cell from a plurality of mobile communications terminals located in the respective geographic area.

8. The method according to claim 1, wherein said determining the amount of data packets handler apparatus resources comprises calculating a distribution function of said probabilities of occupation.

9. The method according to claim 8, wherein said determining the amount of data packets handler apparatus resources comprises:
   setting a target occupation probability;
   determining a value of occupied radio communication resources based on the target occupation probability; and
   determining the amount of data packets handler apparatus resources based on the determined value of occupied radio communication resources.

10. The method according to claim 1, wherein obtaining an indication of the radio communications resources of the at least one cell comprises dimensioning the radio communications resources of the at least one cell.

11. A non-transitory computer readable medium containing instructions that, when executed by a computer, carry out the steps of the method according to claim 1.

12. A method of dimensioning a data packets handler apparatus in a mobile communications network comprising a plurality of cells, each one providing mobile communications coverage in a respective geographic area and comprising at least two sub-cells, said mobile communications network supporting packet-switched traffic, wherein the data packets handler apparatus to be dimensioned is associated with at least one cell of the mobile communications network, comprising:
- obtaining an indication of radio communications resources of the at least one cell;
- obtaining a first indication of packet-switched traffic transmitted by the at least one cell to at least one communication terminal;
- obtaining a second indication of packet-switched traffic received by the at least one cell from at least one mobile communication terminal;
- determining an amount of resources of the data packets handler apparatus potentially needed by the at least two sub-cells for handling the packet-switched traffic based on the indication of radio communications resources and on the packet-switched traffic associated with the at least two sub-cells; and
- cumulating the amounts of data packets handler apparatus resources determined for the at least two sub-cells.

13. A communications system, comprising:
- a mobile communications network having a plurality of cells, each cell providing mobile communications coverage in a respective geographic area; and
- a data packets handler apparatus adapted for association with at least one cell of the mobile communications network, comprising resources for handling packet-switched traffic, the resources being dimensioned based on:
  - an indication of radio communications resources of the at least one cell,
  - a first indication of packet-switched traffic offered to the at least one cell,
  - a second indication of packet-switched traffic transmitted by the at least one cell,
  - a plurality of time periods,
  - for each of the plurality of time periods, an overall amount of resources requested by the plurality of cells, and
  - a maximum of overall amounts, the amount of resources of the data packets handler apparatus corresponding to the maximum of the overall amounts.

14. The method according to claim 13, wherein the overall amount of resources is obtained by:
- calculating a first overall amount of resources related to the packet-switched traffic transmitted by the plurality of cells to mobile communication terminals located in the respective geographic areas, and a second overall amount of resources related to the packet-switched traffic received by the plurality of cells from mobile communications terminals located in the respective geographic areas; and
- taking the maximum between the first and second overall amount of resources.

15. The communications system according to claim 13, wherein the data packets handler apparatus resources are related to a time distribution of packet-switched traffic.

16. The communications system according to claim 13, wherein the data packets handler apparatus resources are related to circuit-switched traffic offered to the at least one cell.

17. The communications system according to claim 16, wherein the data packets handler apparatus resources are also associated with a time distribution of the offered circuit-switched traffic.

18. The communications system according to claim 13, wherein packet-switched traffic comprises general packet radio service data traffic.

19. The communications system according to claim 13, wherein packet-switched traffic comprises an enhanced data rate for global evolution data traffic.

20. The communications system according to claim 13, wherein the packets handler apparatus resources are also associated with a distribution of packet-switched traffic between a first traffic portion transmitted by the at least one network cell to a plurality of mobile communication terminals located in the respective geographic area, and a second traffic portion received by the at least one network cell from a plurality of mobile communications terminals located in the respective geographic area.

* * * * *